US009697373B2

(12) United States Patent
Nelson et al.

(10) Patent No.: US 9,697,373 B2
(45) Date of Patent: Jul. 4, 2017

(54) FACILITATING OWNERSHIP OF ACCESS CONTROL LISTS BY USERS OR GROUPS

(75) Inventors: Kenneth Carlin Nelson, Hollister, CA (US); Marilene A Noronha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 834 days.

(21) Appl. No.: 10/982,376

(22) Filed: Nov. 5, 2004

(65) Prior Publication Data

US 2006/0101019 A1   May 11, 2006

(51) Int. Cl.
*G06F 17/30* (2006.01)
*G06F 21/62* (2013.01)

(52) U.S. Cl.
CPC .. *G06F 21/6218* (2013.01); *G06F 2221/2141* (2013.01)

(58) Field of Classification Search
CPC ............... G06F 21/6218; G06F 21/604; G06F 2221/2141; G06F 9/468; H04L 63/101; H04L 63/105; Y10S 707/99939; G06Q 10/10
USPC ....................................................... 707/9, 10
See application file for complete search history.

(56) References Cited

U.S. PATENT DOCUMENTS

| 6,412,070 | B1* | 6/2002 | Van Dyke et al. ............. 726/17 |
| 6,711,571 | B2 | 3/2004 | Putzolu ............................. 707/9 |
| 6,732,100 | B1 | 5/2004 | Brodersen et al. ............... 707/9 |
| 2001/0044827 | A1 | 11/2001 | Zhuk ............................. 709/205 |
| 2001/0047485 | A1* | 11/2001 | Brown et al. ................. 713/201 |
| 2002/0078215 | A1 | 6/2002 | Tahan ........................... 709/229 |
| 2002/0162077 | A1 | 10/2002 | Jeng et al. ...................... 716/1 |
| 2003/0023728 | A1 | 1/2003 | Yaung ........................... 709/226 |
| 2003/0046576 | A1 | 3/2003 | High, Jr. et al. ............. 713/200 |
| 2003/0088786 | A1 | 5/2003 | Moran et al. ................. 713/201 |
| 2003/0229623 | A1 | 12/2003 | Chang et al. ..................... 707/3 |

* cited by examiner

*Primary Examiner* — Cam-Y Truong
(74) *Attorney, Agent, or Firm* — Patterson + Sheridan, LLP

(57) ABSTRACT

Embodiments of the present invention support a flexible access control design that includes flexible ownership and assignment of access control lists (ACLs). The ACLs can be assigned to one or more resources, or items, or types of resources or items. A creator or owner of an ACL can grant privileges to others such that they may modify or assign the ACL. Each ACL can have one or more owners, i.e., users that can exercise control over the ACL. Any owner of an ACL can designate certain privileges to other users. These other users may then use the ACL based on the privileges granted to them.

24 Claims, 7 Drawing Sheets

USER PROFILE TABLE 308

| USER IDENTIFIER 400 | PRIVILEGE SET 402 |
|---|---|
| USER 1 | ACLOWNER |
| USER 2 | ACLASSIGN |

FIG. 4A

ACCESS CONTROL LIST TABLE 306

| ACL IDENTIFIER 404 | RESOURCE IDENTIFICATION 406 | USER IDENTIFICATION 408 | PRIVILEGE SET 410 |
|---|---|---|---|
| ACL1 | A1234 | USER1 | ACLOWNER |
| ACL1 | A1235 | USER2 | ACLASSIGN |
| ACL1 | A1457 | USER2 | ACLASSIGN |

FIG. 4B

FACILITATING OWNERSHIP OF ACCESS CONTROL LISTS BY USERS OR GROUPS

FIELD

The present invention relates generally to securing access to resources stored in a database system.

BACKGROUND

Access control lists (ACLs) are a well known way of controlling access to protected resources, such as documents. For example, a number of known systems and applications allow restrictions to be placed on how a document can be viewed, printed, modified, or forwarded. Typically, an ACL contains information about which users or groups of users have access to a resource and what level of access each has been granted.

Known systems generally provide two types of ACLs: system or predefined ACLs; and custom or user-defined ACLs. System ACLs are often made available to all users of the system and are typically owned by the system's administrator. Custom or user-defined ACLs are created and owned by a user in the system.

Unfortunately, known systems have difficulty in managing the system ACLs in conjunction with custom ACLs. Users often require the ability to create their own custom ACLs since the rights to a particular resource can vary widely. However, for various security reasons, known systems and applications do not allow a user to access other custom ACLs that were created by different users. For example, known systems generally restrict a user from accessing other custom ACLs in order to prevent that user from intentionally or inadvertently granting improper access to a resource or item. Therefore, users must create their custom ACL from scratch.

As the number of users and resources increases, the complexity of managing custom ACLs grows tremendously. This eventually may consume a large amount of system resources or degrade its performance.

Accordingly, it would be desirable to provide methods and systems that allow for the flexible ownership and use of ACLs.

SUMMARY

In accordance with embodiments of the present invention, access control lists that can be used by a plurality of users are created. Information for an access control list is received from a first user. A set of privileges for the access control list that have been granted to a second user is also received from the first user. The second user is then permitted to use the access control list based on the set of privileges that were granted by the first user.

In accordance with other embodiments of the present invention, an access control list can be assigned to a protected resource. The access control list has been created by a first user and at least one additional user is permitted use of the access control list. A request from the at least one additional user to assign the access control list to the protected resource is received. A set of privileges that have been granted from the first user to the at least one additional user for the access control list is determined. The at least an additional user is then permitted to assign the access control list to the protected resource based on the set of privileges.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 4A shows one example of a user profile table that may be used by embodiments of the present invention;

FIG. 4B shows one example of an access control list table that may be used by embodiments of the present invention;

DESCRIPTION OF THE EMBODIMENTS

Embodiments of the present invention support a flexible access control design. As part of its access control, access control lists (ACLs) can be defined in some embodiments as collections of user identifiers and corresponding privileges or privilege sets. A privilege can be any set of rights or permissions that allow a specific action by a user or group of users, such as create, update, read, or delete. ACLs can be assigned to one or more resources, or items, or types of resources or items.

Some embodiments of the present invention enable flexible ownership and assignment of ACLs. A creator or owner of an ACL can grant privileges to others such that they may modify or assign the ACL based on their privileges. Each ACL can have one or more owners, i.e., users that can exercise control over the ACL. Any owner of an ACL can then designate certain privileges to other users. For example, an owner can designate other users who may themselves assign the ACL to items. An owner may also restrict other owners from being able to modify an ACL. Multiple users may then assign, own, or modify an ACL based on the privileges granted to them.

Some embodiments can provide interfaces to effectively manage ACLs, such as custom or user-defined ACLs. These interfaces can include the ability to list those ACLs in which a user is an owner or those ACLS which the user has been granted privileges to assign. The interfaces can also list system ACLs that are provided to all users.

Figure 1:
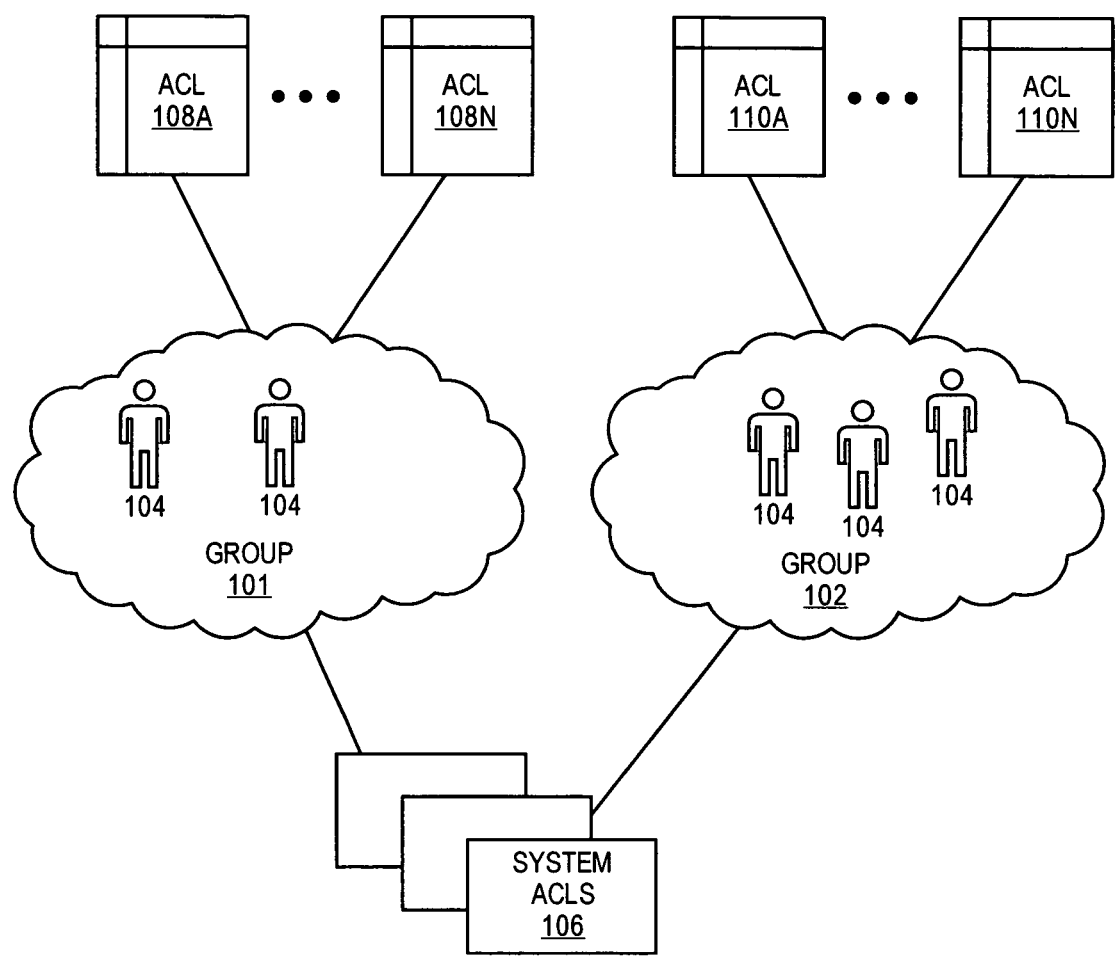
FIG. 1 shows a conceptual diagram of access control lists that are consistent with embodiments of the present invention.

FIG. 1 shows a conceptual diagram of managing ACLs that is consistent with embodiments of the present invention.

As shown, groups 101 and 102 may comprise one or more users 104. System ACLs 106 are made available to all of users 104, i.e., both groups 101 and 102. In addition, however, ACLs 108*a-n* and 110*a-n* are available to groups 101 and 102 respectively. That is, group 101 has privileges to ACLs 108*a-n*, while group 102 has privileges to ACLs 110*a-n*. In some embodiments, group 101 may also be precluded from accessing ACLs outside of its domain, such as those ACLs assigned to group 102, and vice versa.

Reference will now be made in detail to exemplary embodiments of the invention, which are illustrated in the accompanying drawings. Wherever possible, the same reference numbers will be used throughout the drawings to refer to the same or like parts.

Figure 2:
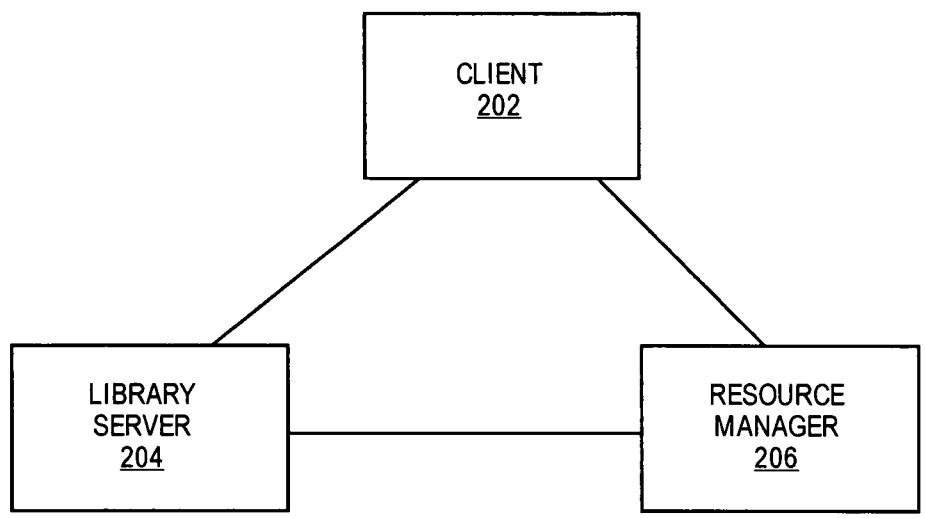
FIG. 2 shows a content management system that is consistent with embodiments of the present invention.

FIG. 2 shows a content management system 200 that is consistent with embodiments of the present invention. As shown, content management system 200 may comprise a client 202, a library server 204, and a resource manager 206. These components may be coupled together using one or more networks, such as a local area network, or wide area network. In addition, these components may communicate with each other using known protocols, such as the transport control protocol and internet protocol ("TCP/IP") and hypertext transport protocol ("HTTP").

The components of content management system 200 may be implemented on separate devices or may be implemented on one or more of the same devices or systems. For example, library server 204 and resource manager 206 may be installed on the same machine and run under a common operating system. Alternatively, content management system 200 may have one or more of its components implemented on multiple machines that run different operating systems. Some of the specific components of content management system 200 will now be described.

Client 202 provides a user interface for content management system 200. Client 202 may be implemented using a variety of devices and software. For example client 202 may be implemented on a personal computer, workstation, or terminal. In addition, client 202 may run under a Windows operating system, or through a browser application, such as Internet Explorer™ by Microsoft® Corporation or FireFox by Mozilla. Although FIG. 2 shows a single client, content management system 200 may include any number of clients.

Library server 204 stores, manages, and provides access control to items and resources stored by content management system 200. Library server 204 processes requests, such as creates, reads, updates, and deletes, from client 202 and maintains the data integrity between the other components of content management system 200, such as resource manager 206. For example, library server 204 may work in conjunction with resource manager 206 to retrieve an object, such as a document or image file, that is referenced by an item. In addition, library server 204 may enforce certain access controls, such as access control lists, to protect the resources or items stored by resource manager 206.

Library server 204 may be implemented using a variety of devices and software. For example, library server 204 may be a computer that runs one or more application programs and stored procedures under an operating system, such as z/OS, Windows, AIX, or Solaris. In addition, library server 204 may include a database management system, such as a relational database management system, to manage stored items and perform searches for content management system 200. For example, library server 204 may use the DB2 Universal Database by International Business Machines Corporation. Library server 204 is also described with reference to FIG. 3.

Resource manager 206 stores objects corresponding to items or resources in content management system 200. Items or resources may be any data entity that is in digital form. For example, an item or resource may be an audio file, an application, an image, text, or a video file. Resource manager 206 may store the items or resources in various formats, such as JPEG images, MP3 audio, AVI video, and ASCII text. Resource manager 206 may also store items or resources in formats, such as Microsoft® Word™, Lotus® Word Pro™, and Wordperfect™.

Furthermore, resource manager 206 may also be configured to store multiple copies of items or resources on the same or a separate resource manager (not shown). Although FIG. 2 shows a single resource manager, content management system 200 may include any number of resource managers. For example, content management system 200 may include multiple resource managers that are distributed across one or more networks.

Resource manager 206 may be implemented using known devices and software. For example, resource manager 206 may be installed on one or more computers that run under the z/OS operating system, and includes a DB2 Universal Database, as well as a server to communicate with client 202 and library server 204, such as a HTTP server. In addition, resource manager 206 may include one or more storage devices, such as a magnetic disc drive.

Figure 2A:
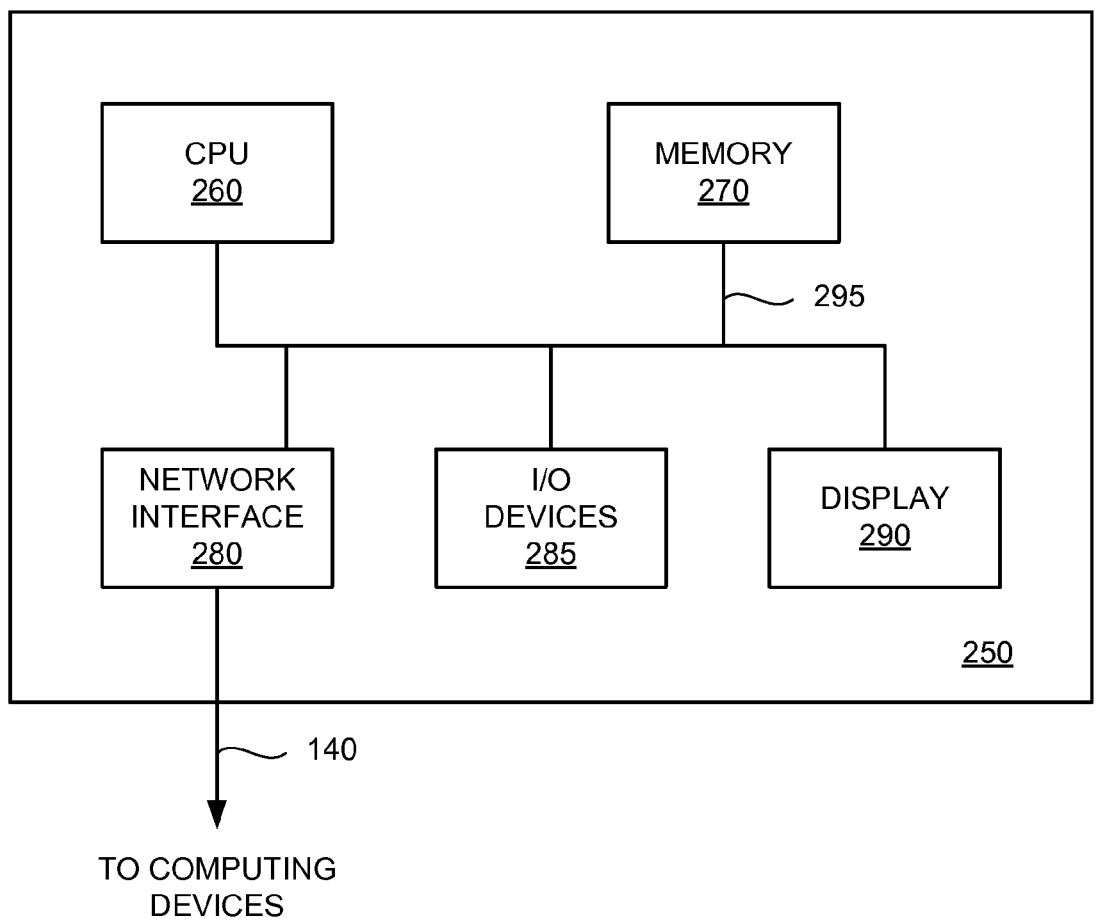
FIG. 2A is an internal block diagram of an exemplary computer system in which methods and systems consistent with the invention may be implemented.

FIG. 2A is an internal block diagram of an exemplary computer system 250 in which methods and systems consistent with the invention may be implemented. Computer system 250 may represent the internal components of the client 202, library server 204, resource manager 206 or servers of content management system 200 in FIG. 2.

Computer system 250 may be, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or other such computers known in the art.

Computer system 250 includes CPU 260, memory 270, network interface 280, I/O devices 285, display 290, all interconnected via a system bus 295. As shown in FIG. 2A, computer system 250 contains a central processing unit (CPU) 260. CPU 260 may be a microprocessor such as the Pentium® family of microprocessors manufactured by Intel Corporation. However, any other suitable microprocessor, micro-, mini-, or mainframe computer may be used, such as a micro-controller unit (MCU), digital signal processor (DSP).

Memory 270 may include a random access memory (RAM), a read-only memory (ROM), a video memory, mass storage, or cache memory such as fixed and removable media (e.g., magnetic, optical, or magnetic optical storage systems or other available mass storage technology).

Memory 270 stores support modules such as, for example, a basic input output system (BIOS), an operating system (OS), a program library, a compiler, an interpreter, and a text-processing tool. Support modules are commercially available and can be installed on computer system 250 by those of skill in the art. For simplicity, these modules are not illustrated. Further, memory 270 may contain an operating system, an application routine, a program, an application-programming interface (API), and other instructions for performing the methods consistent with the invention.

Network interface 280, examples of which include Ethernet or dial-up telephone connections, may be used to communicate with computing systems on network 140. Computer system 250 may also receive input via input/output (I/O) devices 285, which may include a keyboard, pointing device, or other like input devices. Computer system 250 may also present information and interfaces via a display 290 to a user.

Bus 295 may be a bi-directional system bus. For example, bus 295 may contain thirty-two address bit lines for addressing a memory 270 and thirty-two bit data lines across which data is transferred among the components. Alternatively, multiplexed data/address lines may be used instead of separate data and address lines.

Figure 3:
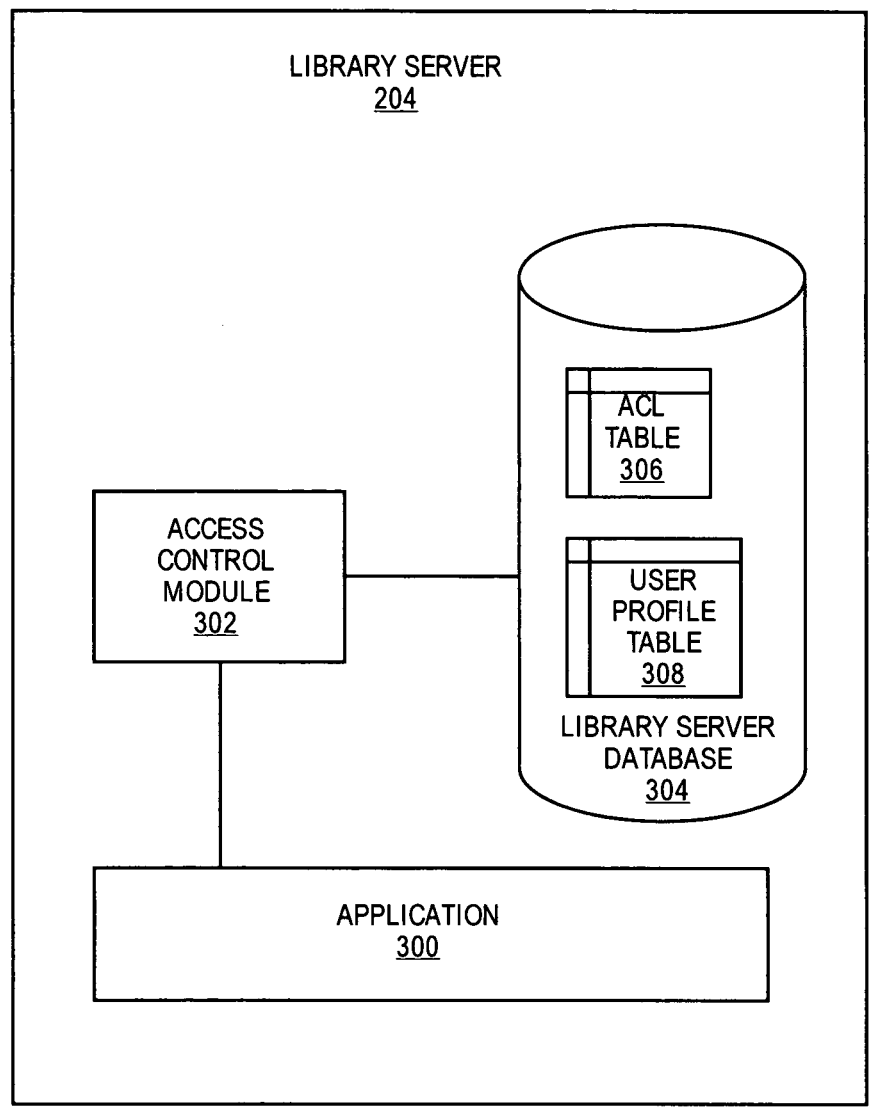
FIG. 3 shows a library server that is consistent with embodiments of the present invention.

FIG. 3 shows a library server 204 that is consistent with embodiments of the present invention. As shown, library server 204 may comprise an application program 300, an access control module 302, and a library server database 304.

Application program 300 is program code that implements the functions and procedures of library server 204, such as communications with client 202 and resource manager 206 and operations with library server database 304. Application program 300 may be written in a variety of host programming languages, such as C, C++, Java®, or COBOL.

Library server database 304 serves as a catalog for items stored by content management system 200. Library server database 304 may include one or more data structures that protect access to the items or resources stored by resource manager 206.

Access control module 302 is program code that implements the access controls enforced by library server 204, such as retrieving ACL privileges granted to users 104 and accessing ACLs assigned to a requested item or resource. Access control module 302 may be implemented as any combination of hardware, firmware or software. For example, access control module 302 may be software written in a variety of host programming languages, such as C, C++, Java, or COBOL. Although access control module 302 is shown as a component separate from application program 300, one skilled in the art will recognize that access control module 302 may be integrated within application program or some other component of library server 204.

Library server database 304 may be implemented using a variety of devices and software. For example, library server database 304 may be implemented as a relational database, such as a DB2 Universal Database. In addition, library server database 304 may use a variety of types of storage, such as tape drive, optical storage units, or magnetic disk drive.

In order to assist with access controls, library server database 304 may use a set of tables, such as an ACL table 306 and a user profile table 308. ACL table 306 can be any data structure that specifies the security protections that apply to a resource or item. User profile table 308 can be any data structure that specifies the privileges granted to a user or group of users. An example of ACL table 306 and user profile table 308 are described with reference to FIGS. 4A and 4B.

In some embodiments, library server 304 may use one or more flags, such as a binary bit, to indicate various types of ACLs. For example, an administrator defined or system ACL (i.e., an ACL that is available for all users) may be flagged with a binary value of "0." Meanwhile, user-defined or custom ACLs may be flagged with a binary value of "1." The management of these user-defined or custom ACLs in some embodiments will now be further described. For example, an administrator of application program 300 may grant one or more users 104 the ability to create their own custom ACLs. Of course, one skilled in the art will recognize that users may be granted the ability to create their own ACLs by default, without administrator or other permissions.

In some embodiments, one or more of users 104 can be granted various privileges to an ACL. For example, one or more of users 104 can be granted ownership of an ACL. The privileges of a user may be set forth in user profile table 308 in what can be referred to as the general privilege set of a user. In addition, ACL table 306 can set forth which of users 104, either directly or via a group rule, can change or delete the ACL. If a user has ownership of an ACL, that user can assign that ACL to an item or item type.

In addition, one or more of users 104 can be granted certain limited privileges of an ACL, such as the privilege or right to assign the ACL to a resource or item. Again, this privilege may be granted to a user by configuring the user's general privilege set in user profile table 308. In addition, this privilege may be indicated for the user in ACL table 306, either directly or via a group rule.

In some embodiments, the above privileges to an ACL can be handled like other privileges to an item or resource, for example, to benefit from existing logic previously implemented in application program 300 or access control module 302. In addition, other access rules enforced by application program 300 may be maintained. For example, if a user has more general access to items in addition to ownership or assign rights of an ACL, such as administrator rights, that user may be granted ownership in every user-defined ACL, or may be able to assign every user-defined ACL.

In order to assist a user with managing ACLs, application program 300 may operate in conjunction with access control module 302 to provide one or more ACL interfaces. For example, application program 300 may interface with client 202 to provide a list of all ACLs, a list of only system ACLs, a list of all ACLs a user owns, a list of ACL's a user can assign. In addition, application program 300 may allow a user to search and retrieve an ACL by name or some other criteria. Application program 300 may allow displaying ACLs based on user privileges or display name. For example, application program 300 may provide an interface that lists all ACLs in which a user has "delete" authority.

Client 202 likewise can enable users 104 to create, list, assign, and modify their user-defined ACLs. One or more dialogs may be provided from application program 300 to client 202 to assist in searching and listing users or groups. In some embodiments, these lists can be restricted to certain domains, users, or groups.

When a user creates a user-defined ACL, the user may be prompted by application program 300 to provide a name or identifier for the ACL. Alternatively, application program 300 may generate a name for the ACL automatically. For example, in some embodiments, application program 300 can generate a code with one or more digits. In addition, the user may provide a description or display name for the user-defined ACL.

In order to assist with the creation of user-defined ACLs, access control module 302 can include various pre-defined privilege sets (or privilege groups) including the new user ACL privileges. In these embodiments, the privilege sets can be created by a post-install program and may also be modified later, such as by the administrator of application program 300. Examples of the tables used to enforce these access controls will now be described with reference to FIGS. 4A and 4B.

FIG. 4A shows one example of a user profile table 308 that may be used by embodiments of the present invention. As noted, user profile table 308 can indicate the various privileges granted to a user. As shown, user profile table 308 may include user identifier column 400 and a privilege set column 402.

User identifier column 400 includes information that uniquely identifies each user or group of users of application program 300. A user identifier may be in a variety of formats, such as numeric or alpha numeric. For example, user profile table 308 is illustrated with "user1" and "user2" in user identifier column 400. In addition, the user identifier may be assigned automatically by library server 204.

Privilege set column 402 includes information that indicates the privileges granted to a user. The privileges may be indicated in a variety of formats, such as numeric or alpha numeric codes. For example, "UserACLowner" and "UserACLassign" may be used to indicate whether a user has ownership or assign privileges, respectively. As shown in FIG. 4A, user1 has been granted "ownership" privileges and user2 "assign" privileges.

FIG. 4B shows one example of access control list table 306 that may be used by embodiments of the present invention. As noted, ACL table 306 can be used to indicate the various privileges and security measures used to protect an item or resource. In some embodiments, ACL table 306 can include an ACL identifier column 404, a resource identifier column 406, a user identifier column 408, and a privilege set column 410.

ACL identifier column 404 includes information that identifies a particular ACL. These identifiers may be determined by a user, such as the user that created the ACL or one of the owners of the ACL, or may be automatically generated by content management system 200 or library server 204. The identifier for an ACL may be in a variety of formats, such as numeric or alpha numeric. For example, as shown in FIG. 4B, ACL table 306 is illustrated with "ACL1" and "ACL2" in ACL identifier column 404.

Resource identifier column 406 includes information that identifies one or more resources or items. These identifiers may also be determined by a user, such as the user that created the resource, or may be automatically generated by content management system 200 or library server 204. The identifier for a resource or item may be in a variety of formats, such as numeric or alpha numeric. For example, as shown in FIG. 4B, ACL table 306 is illustrated with "A1234", "A1235", and "B1457" as identifiers for resources in resource identifier column 406.

User identifier column 408 includes information that identifies one or more users that are to be associated with an ACL. These identifiers may be determined by the user themselves, or may be automatically generated by content management system 200 or library server 204. The identifier for a user may be in a variety of formats, such as numeric or alpha numeric. For example, as shown in FIG. 4B, ACL table 306 is illustrated with "user1" and "user2" as exemplary users identified in user identifier column 408. Alternatively, user identifier column 408 may identify one or more types of users, groups of users, or specific roles of users.

Privilege set column 410 includes information that indicates the one or more privileges assigned to a user for a particular ACL. The privileges may be indicated in a variety of formats, such as numeric or alpha numeric codes. For example, as shown in FIG. 4B, "UserACLowner" has been assigned as a privilege to "user1" for "ACL1." In addition, "UserACLassign" may be assigned as a privilege to "user2" also for "ACL1." The privileges may also refer to other actions or even other privileges based on the configuration of application program 300 and access control module 302. Although FIG. 4B is illustrated with a single privilege, one skilled in the art will recognize that multiple privileges may be assigned to a user. For example, "user2" may also be assigned other privileges for "ACL1," such as "read" privileges. In addition, privileges may be grouped together into one or more sets that are defined by a user or administrator of application program 300, or provided automatically by the application program 300.

One skilled in the art will recognize that tables 306 and 308 are merely exemplary data structures that may be used by embodiments of the present invention. Any type of data structure can be used by embodiments of the present invention to enable flexible ownership and assignment of user-defined ACLs. Exemplary process flows for the creation, ownership, and assignment of user-defined ACLs will now be described below.

Figure 5:
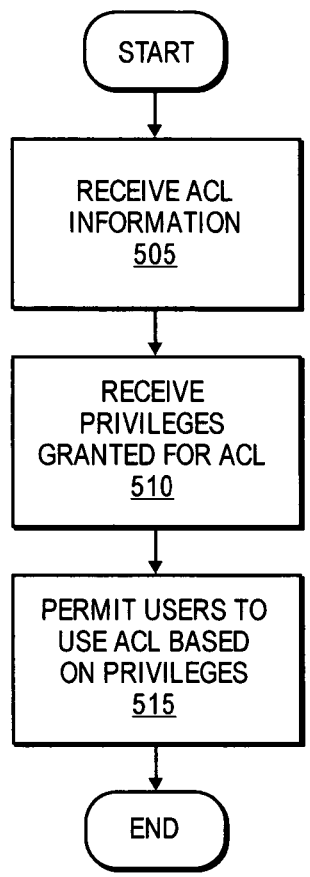
FIG. 5 shows a process flow for creating an access control list in accordance with the principles of the present invention.

FIG. 5 shows a process flow for creating an access control list in accordance with the principles of the present invention. In step 505, a first user provides information to application program 300 for creating an ACL. For example, one of users 104 may operate client 202 and interface with library server 204 to specify various parameters for an ACL. As noted above, in some embodiments, application program 300 of library server 204 may provide one or more interfaces that assist a user in creating or modifying an ACL. Such interfaces may use well known graphical user interface techniques like windows, pull-down menus, and dialog boxes. For example, application program 300 may provide a log or list of ACLs that have been accessed by a user, such as those ACLs that have been added, updated, or deleted within the current session.

The parameters specified by the user may include the resources or items of interest, privileges or rights to assigned, who can access the resource or item, and what level of access these users are granted. The user may also provide other information, such as a name for the ACL and a brief description of the ACL. Alternatively, the user may retrieve information from other ACLs, such as those authored by that user or from those ACLs that the user has privileges. Processing then flows to step 510.

In step 510, the user creating the ACL may also grant one or more privileges to another user. For example, the user creating the ACL may be automatically designated by application program 300 in tables 306 and 308 as an owner of that ACL. In turn, that user may grant privileges to the ACL to other users. For example, an owner of an ACL may designate other users as owners of the ACL such that they can also read, modify, or delete that ACL. In addition, an owner of an ACL may allow other users to assign the ACL to resources or items of their choosing. Other privileges and rights may be granted, such as read access. For example, a user may be: restricted from accessing the ACL; be allowed to: view, but not change the ACL; read and create a new version of the ACL; read and modify the ACL; and delete the ACL. Furthermore, application program 300 may provide one or more default sets of privileges.

Application program 300 may be configured to control how a user may designate privileges to an ACL. For example, only owners of an ACL may be allowed to designate privileges to an ACL. Alternatively, users may inherit privileges to an ACL based on their role or grouping in which they are member. Embodiments of the present invention can support a wide variety of rules and configurations of designating privileges to an ACL.

In some embodiments, privileges to an ACL may be granted or modified through an interface provided by library server 204 through application program 300. As noted above, this interface may use well known graphical user interface features to determine which privileges and to whom have been granted for an ACL. In turn, application program 300 may then modify the information in tables 306 and 308 store this information. Processing then flows to step 515.

In step 515, the users who have been granted privileges may use the corresponding one or more ACLs. For example, library server 204 may refer to tables 306 and 308 to control who may access and use an ACL. As noted, in the examples shown in FIGS. 4A and 4B, "user1" is the owner of "ACL1" and "user2" has been granted the privilege of assigning "ACL1" to a resource or item. In some embodiments, library server 204 may first check user profile table 308 to determine whether "user2" has ACL assignment rights as part of his general privilege set. Library server 204 may then check ACL table 306 to determine which specific ACL "user2" has been granted privileges.

Application program 300 or library server 204 may also enforce various rules in determining how privileges to an ACL are granted. For example, application program 300 may restrict the privileges of users based on their role, domain, or context of their requested actions. Privileges of the ACLs themselves may also depend on the role of the ACL or based on inheriting privileges from another transaction involving the resource or item. Other types of policies for granting and enforcing privileges to an ACL can also be supported by embodiments of the present invention.

Figure 6:
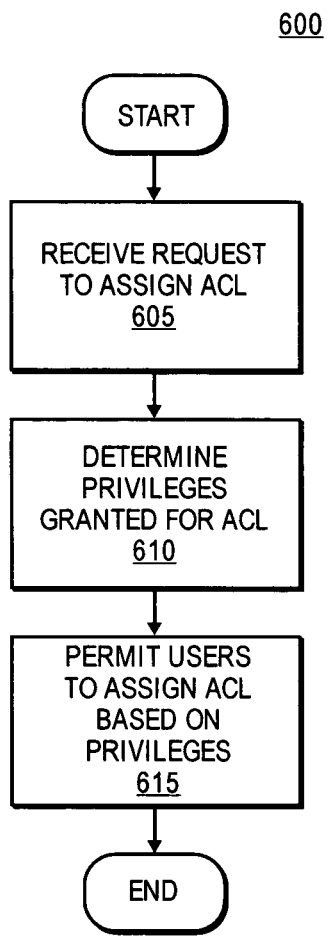
FIG. 6 shows a process flow for assigning an access control list in accordance with the principles of the present invention.

FIG. 6 shows a process flow for assigning an access control list in accordance with the principles of the present invention. In particular, a process flow for assigning an ACL to a protected resource, such as a document or other type of file, is shown. In this example, it is assumed that a first user of users 104 previously created the ACL.

In step 605, application program 300 receives a request to assign the access control list to a protected resource from an additional user (e.g., a user other than the first user). For example, the additional user may operate client 202 to interface with library server 204 to select one or more ACLs. In some embodiments, the additional user may search for ACLs based on a variety of criteria, such as ACL name, ACL owner, keywords in the description, etc. Library server 204 may then conduct a search in library server database 304 to find one or more ACLs that match the additional user's criteria. The matching ACLs may then be presented using one or more interfaces through application program 300.

Library server 204 can also be configured to restrict the ACLs that are presented to the additional user. For example, access control module 302 may implement one or more policies that control how ACLs are presented. Access control module 302 may refer to either user profile table 308 and ACL table 306 or both to determine whether an ACL can be presented to a particular user. In particular, access control module 302 may check the privileges indicated in privilege set column 402 or privilege set column 410 of these tables respectively. Access control module 302 may also be provided various security policies, for example by an administrator of application program 300 that control how ACLs are presented and managed.

The additional user may then select one or more of the presented ACLs. In addition, the additional user may specify one or more items or resources to which the selected ACL is to be assigned. Processing by application program 300 then flows to step 610.

In step 610, access control module 302 determines the privileges that have been granted from the first user to the additional user. In particular, access control module 302 may check user profile table 308 to determine whether the additional user, such as "user2," has been granted assignment rights as part of his privileges. In some embodiments, access control module 302 may also check ACL table 306 to determine whether the additional user has been granted privileges specifically to the selected ACL. Of course one skilled in the art will recognize that application program 300 may determine the privileges granted to a user using a variety of other techniques, such as querying one or more other tables (not shown) in library server database 304.

For example, as shown in FIGS. 4A and 4B, "user2" has indeed been granted assign rights to "ACL1." Therefore, in this example, access control module 302 would determine that "user2" has been granted privileges to "ACL1" based on the information in user profile table 308 and ACL table 306. Access control module 302 may then notify application program 300 of the privileges granted to this user. Processing then flows to step 615.

In step 615, application program 300 permits the additional user to assign the ACL to the protected resource based on his privileges. For example, application program 300 may receive an identifier for the protected resource from the additional user and then write this information to ACL table 306. As shown in FIG. 4B, application program 300 has permitted "user2" to assign "ACL1" to resources "A1235" and "B1457." In addition, application program 300 may communicate with resource manager 206 to indicate that one or more of its resources have been assigned an ACL. In turn, resource manager 206 may implement one or more protections on these resources based on the security measures included in the ACL. Processing by application program 300 is then complete.

Although embodiments of the present invention are described as being associated with programs stored in memory and other storage mediums, one skilled in the art will appreciate that these aspects can also be stored on, or read from, other types of computer-readable media, such as secondary storage devices, like hard disks, floppy disks, or CD-ROM; or other forms of RAM or ROM. Accordingly, the invention is not limited to the above-described embodiments, but instead is defined by the appended claims in light of their full scope of equivalents.

Further, methods consistent with embodiments of the invention, such as those illustrated in FIGS. 5 and 6, may conveniently be implemented using program modules. Such program modules, when executed, may perform the steps and features disclosed herein, including those disclosed with reference to the exemplary flow charts of FIGS. 5 and 6. No particular programming language has been indicated for carrying out the various procedures described above because it is considered that the operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the invention, or it may be more convenient to construct a specialized apparatus or system to perform the required methods and techniques.

Embodiments of the present invention also relate to computer-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the invention disclosed herein. It is intended that the specification and examples be considered as exemplary only.

What is claimed is:

1. A computer-implemented method to facilitate applying existing access control lists (ACLs) to new resources while restricting ACL modification, the computer-implemented method comprising:
    storing first and second resources by a content management system (CMS) having an associated graphical user interface and configured to enforce each access control list (ACL) type selected from a system ACL and a custom ACL, each ACL type identifiable via a respective flag;
    responsive to a request received from a first user via the user interface, creating an ACL having a name and an associated set of privileges and designating the first user as an owner of the ACL, the set of privileges including at least two distinct privileges selected from a read privilege, a list privilege, an assignment privilege, a modification privilege, a delete privilege, and a grant privilege, wherein the ACL defines access rights applicable to at least two resource types selected from a document, an application, an image file, a text file, an audio file, and a video file;
    upon receiving, from the owner of the ACL, a request to assign the ACL to the first resource, assigning the ACL to the first resource;
    subsequent to the assigning of the ACL to the first resource, enforcing, by the CMS and based on the ACL, access rights for the first resource;
    upon receiving, from the owner of the ACL, a request to grant a second user a specified privilege consisting of the assignment privilege for the ACL, granting the specified privilege to the second user;
    subsequent to the granting of the specified privilege, and responsive to receiving, from the second user, a request to assign the ACL to the second resource, determining whether the second user has the assignment privilege for the ACL;
    upon determining that the second user has the assignment privilege for the ACL, assigning the ACL to the second resource by the CMS when executed by one or more computer processors, and restricting the second user from modifying the ACL;
    subsequent to the assigning of the ACL to the second resource, enforcing, by the CMS and based on the ACL, access rights for the first and second resources; and
    responsive to a search request specifying a search criterion selected from the ACL name, an ACL owner, and an ACL keyword, generating, by the CMS, a set of search results including at least one ACL matching the search criterion, wherein the set of search results is output via the user interface.

2. The computer-implemented method of claim 1, wherein the set of privileges includes the read privilege, the list privilege, the assignment privilege, the modification privilege, the delete privilege, and the grant privilege.

3. The computer-implemented method of claim 1, wherein creating the ACL includes automatically generating a unique name for the ACL, the unique name comprising the name, wherein the list privilege comprises a privilege to list available ACLs, wherein the grant privilege comprises a privilege to grant, to other users, privileges to the ACL, wherein the access rights defined by the ACL are defined for one or more users and pertain to each resource type selected from a document, an application, an image file, a text file, an audio file, and a video file, wherein the access rights defined by the ACL for the one or more users are separate from the set of privileges and include rights to view, print, modify, forward, and delete a given resource governed by the ACL, wherein restricting the second user from modifying the ACL comprises:
    permitting modification of the ACL by the second user only upon determining that the second user has the modification privilege for the ACL.

4. The computer-implemented method of claim 3, wherein the computer-implemented method further comprises:
    representing the granted privilege via a data structure containing a reference to the second user, a reference to the assignment privilege, and a reference to the ACL; and
    storing third resources by the CMS, wherein the CMS comprises a plurality of components including:
    a client component operable to provide the user interface for the CMS, the user interface accepting parameters for creating and modifying the ACL, respectively;
    a resource manager component operable to store objects corresponding to resources in the CMS; and
    a library server component.

5. The computer-implemented method of claim 4, wherein the library server component is operable to:
    (i) store, manage, and provide access control to resources stored by the CMS;
    (ii) maintain data integrity between the plurality of components of the CMS; and
    (iii) enforce access controls to protect the resources stored by the resource manager component, the access controls including the ACL;
    wherein the library server component includes:
    (i) an access control module implementing the access controls enforced by the library server;
    (ii) an application program implementing functionality of the library server; and
    (iii) a library server database serving as a catalog for resources stored by the resource manager component, wherein the library server database comprises a plurality of tables used in enforcing the access controls.

6. The computer-implemented method of claim 5, wherein the plurality of tables includes:

(i) an ACL table specifying, for each resource of a plurality of resources restored in the CMS, security protections that apply to the respective resource; and
(ii) a user profile table specifying, for each user of a plurality of users supported by the CMS, privileges granted to respective user.

7. The computer-implemented method of claim 6, wherein the ACL table includes an ACL identifier field, a resource identifier field, a user identifier field, and a privilege set field, wherein the user profile table includes a user identifier field and a privilege set field, wherein the library server component independently enforces each individual ACL type selected from system ACLs and custom ACLs, wherein the system ACLs are identified by virtue of a first flag set by the library server component, wherein the custom ACLs are identified by virtue of a second flag set by the library server component, different from the first flag.

8. The computer-implemented method of claim 7, further comprising:
upon receiving, from the first user, a request to grant a first group of users the assignment privilege to the ACL, granting the first group of users the assignment privilege to the ACL, wherein the granted privilege to the first group of users is represented by a second data structure containing a reference to the first group of users, a reference to the assignment privilege, and a reference to the ACL.

9. The computer-implemented method of claim 8, whereby the ACL is assigned to the second resource and restricting the second user from unauthorized modification of the ACL, wherein the assignment privilege is not granted to a third user, wherein the computer-implemented method further comprises:
restricting the third user from causing the ACL to be assigned to the third resource.

10. The computer-implemented method of claim 9, further comprising:
upon receiving, in respective instances and from each user of the first group of users, a respective request to assign the ACL to a respective resource, assigning the ACL to the respective resource.

11. The computer-implemented method of claim 10, wherein the application program restricts user privileges based on: (i) user roles; (ii) user domains; and (ii) contexts of requested user actions.

12. The computer-implemented method of claim 1, further comprising automatically generating a unique name for the ACL, the unique name comprising the name.

13. The computer-implemented method of claim 1, wherein the access rights defined by the ACL are applicable to a document, an application, an image file, a text file, an audio file, and a video file.

14. The computer-implemented method of claim 13, wherein the access rights defined by the ACL are separate from the set of privileges and correspond to rights to view, print, modify, forward, or delete a given resource governed by the ACL.

15. A computer program product to facilitate applying existing access control lists (ACLs) to new resources while restricting ACL modification, the computer program product comprising a non-transitory computer-readable medium having computer usable program code of a content management system (CMS), the computer usable program code executable to:
store first and second resources by the CMS, the CMS having an associated graphical user interface and configured to enforce each access control list (ACL) type selected from a system ACL and a custom ACL, each ACL type identifiable via a respective flag;
responsive to a request received from a first user via the user interface, create an ACL having a name and an associated set of distinct privileges and designating the first user as an owner of the ACL, the set of privileges including at least two distinct privileges selected from a read privilege, a list privilege, an assignment privilege, a modification privilege, a delete privilege, and a grant privilege, wherein the ACL defines access rights applicable to at least two resource types selected from a document, an application, an image file, a text file, an audio file, and a video file;
upon receiving, from the owner of the ACL, a request to assign the ACL to the first resource, assign the ACL to the first resource;
subsequent to the assigning of the ACL to the first resource, enforce, by the CMS and based on the ACL, access rights for the first resource;
upon receiving, from the owner of the ACL, a request to grant a second user a specified privilege consisting of the assignment privilege for the ACL, grant the specified privilege to the second user;
subsequent to the granting of the specified privilege, and responsive to receiving, from the second user, a request to assign the ACL to the second resource, determine whether the second user has the assignment privilege for the ACL;
upon determining that the second user has the assignment privilege for the ACL, assign the ACL to the second resource by the CMS when executed by one or more computer processors, and restricting the second user from modifying the ACL;
subsequent to the assigning of the ACL to the second resource, enforce, by the CMS and based on the ACL, access rights for the first and second resources; and
responsive to a search request specifying a search criterion selected from the ACL name, an ACL owner, and an ACL keyword, generate, by the CMS, a set of search results including at least one ACL matching the search criterion, wherein the set of search results is output via the user interface.

16. The computer program product of claim 15, wherein the set of privileges includes the read privilege, the list privilege, the assignment privilege, the modification privilege, the delete privilege, and the grant privilege.

17. The computer program product of claim 15, wherein the computer usable program code is further executable to automatically generate a unique name for the ACL, the unique name comprising the name.

18. The computer program product of claim 15, wherein the access rights defined by the ACL are applicable to a document, an application, an image file, a text file, an audio file, and a video file.

19. The computer program product of claim 18, wherein the access rights defined by the ACL are separate from the set of privileges and correspond to rights to view, print, modify, forward, or delete a given resource governed by the ACL.

20. A content management system (CMS) to facilitate applying existing access control lists (ACLs) to new resources while restricting ACL modification, the CMS comprising:
one or more computer processors; and
a memory containing a program, which when executed by the one or more computer processors performs an operation comprising:

storing first and second resources by the CMS, the CMS having an associated graphical user interface and configured to enforce each access control list (ACL) type selected from a system ACL and a custom ACL, each ACL type identifiable via a respective flag;

responsive to a request received from a first user via the user interface, creating an ACL having a name and an associated set of privileges and designating the first user as an owner of the ACL, the set of privileges including at least two distinct privileges selected from a read privilege, a list privilege, an assignment privilege, a modification privilege, a delete privilege, and a grant privilege, wherein the ACL defines access rights applicable to at least two resource types selected from a document, an application, an image file, a text file, an audio file, and a video file;

upon receiving, from the owner of the ACL, a request to assign the ACL to the first resource, assigning the ACL to the first resource;

subsequent to the assigning of the ACL to the first resource, enforcing, by the CMS and based on the ACL, access rights for the first resource;

upon receiving, from the owner of the ACL, a request to grant a second user a specified privilege consisting of the assignment privilege for the ACL, granting the specified privilege to the second user;

subsequent to the granting of the specified privilege, and responsive to receiving, from the second user, a request to assign the ACL to the second resource, determining whether the second user has the assignment privilege for the ACL;

upon determining that the second user has the assignment privilege for the ACL, assigning the ACL to the second resource and restricting the second user from modifying the ACL;

subsequent to the assigning of the ACL to the second resource, enforcing, by the CMS and based on the ACL, access rights for the first and second resources; and responsive to a search request specifying a search criterion selected from the ACL name, an ACL owner, and an ACL keyword, generating, by the CMS, a set of search results including at least one ACL matching the search criterion, wherein the set of search results is output via the user interface.

21. The CMS of claim 20, wherein the set of privileges includes the read privilege, the list privilege, the assignment privilege, the modification privilege, the delete privilege, and the grant privilege.

22. The CMS of claim 20, wherein the operation further comprises automatically generating a unique name for the ACL, the unique name comprising the name.

23. The CMS of claim 20, wherein the access rights defined by the ACL are applicable to a document, an application, an image file, a text file, an audio file, and a video file.

24. The CMS of claim 23, wherein the access rights defined by the ACL are separate from the set of privileges and correspond to rights to view, print, modify, forward, or delete a given resource governed by the ACL.

* * * * *